W. McLAIN.
OIL CUP.
APPLICATION FILED MAY 27, 1908.
904,354.
Patented Nov. 17, 1908.
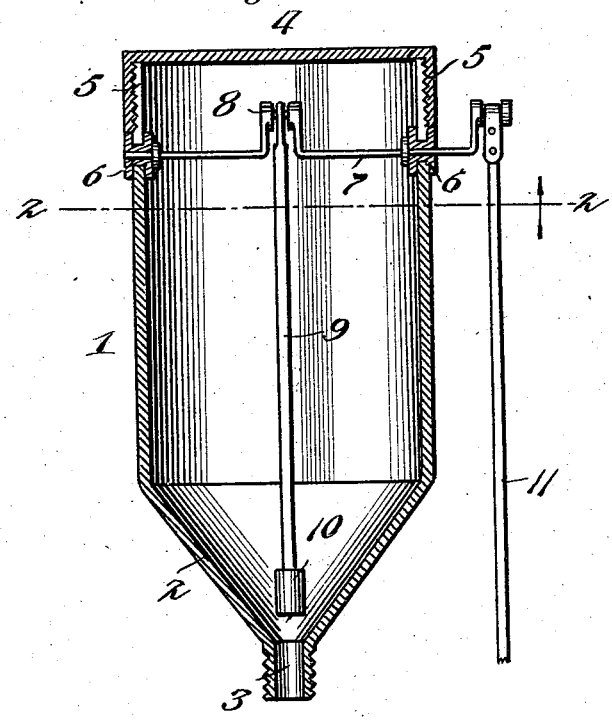
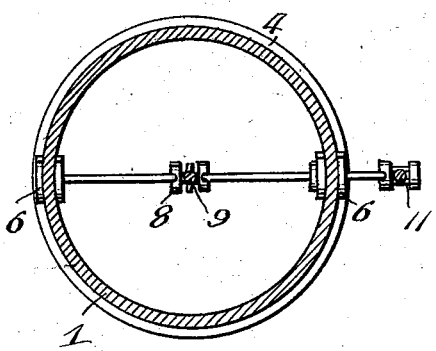
Witnesses
Hugh H. Ott.
Inventor
Walter McLain
By Victor J. Evans
Attorney

UNITED STATES PATENT OFFICE.

WALTER McLAIN, OF SPIRITWOOD, NORTH DAKOTA.

OIL-CUP.

No. 904,354.　　　　Specification of Letters Patent.　　　　Patented Nov. 17, 1908.

Application filed May 27, 1908. Serial No. 435,349.

*To all whom it may concern:*

Be it known that I, WALTER McLAIN, a citizen of the United States, residing at Spiritwood, in the county of Stutsman and State of North Dakota, have invented new and useful Improvements in Oil - Cups, of which the following is a specification.

This invention relates to oil cups, of that class used for forcing heavy oil or other similar lubricant which will not readily flow, to a journal bearing or other machine element, the object of this invention being to provide an improved and simple construction which is positive in action and which may be readily operated by a crank pin or eccentric of an engine or machine to which it is applied.

With these and other objects in view the invention resides in the novel construction and arrangement of elements hereinafter fully described and claimed.

In the accompanying drawings, Figure 1 is a central longitudinal sectional view of an oil cup constructed in accordance with the present invention. Fig. 2 is a horizontal sectional view upon the line 2—2 of Fig. 1, and looking in the direction of the arrows.

In the accompanying drawings the numeral 1 designates the oil cup. This oil cup 1 is preferably cylindrical in form and has its lower portion cone-shaped as indicated by the numeral 2 and is provided with a reduced outlet spout 3. This spout 3 is provided with threads by which it may be readily secured to the bearing to be lubricated. The upper end of the cup 1 is also provided with exterior threads adapted for the reception of the threaded side portion of a cap or closure 4. The upper portion of the cup 1 is provided with diametrically oppositely slit or cut away portions 5 adapted for the reception of suitable bearings 6. These bearings 6 are adapted for the reception of a crank shaft 7, and the bearings are retained securely in position by the flanged sides of the closure 4. The shaft 7 is provided with a centrally arranged offset 8, and pivotally connected with this offset is a plunger rod 9 having a plunger 10 adapted to normally overlie the outlet spout 3 of the cup. One end of the shaft 7 is adapted to extend a suitable distance to one side of the cup 1, and this extending portion is bent to form a bearing arm adapted for engagement with an operating rod 11. This operating rod 11 is adapted to be attached to the crank pin of an engine or machine so as to impart a reciprocatory movement to the plunger 10, which will force a portion of the lubricant within the receptacle 1 through the spout 3 and upon the bearing to which the cup 1 is attached.

It is to be understood that this oil cup is intended for use in connection with lubricants such as heavy oil which will not readily flow and which requires to be forced to the bearing or other machine element, and it will be noted that the device is extremely simple in construction cheap in manufacture and that it will accomplish the purposes for which it is intended efficiently and with certainty.

While the preferred construction of the device is herewith illustrated and described, it is to be understood that minor details of construction within the scope of the following claims may be resorted to without departing from the spirit or sacrificing any of the advantages of the invention.

Having thus fully described the invention what is claimed as new is:

1. A cup for lubricant, having a discharge opening at its lower end and having upwardly extending slots in opposite sides, open at their upper ends, bearings in and removable from said slots, a shaft mounted in said bearings, having operating means at one of its ends located without the cup, said shaft having a crank at a point within the cup and above said discharge opening, a plunger to operate in the lower portion of the cup and in said discharge opening and having an upwardly extending rod connected to the crank for operation thereby, and a cover for the cup having means to bear on the bearings and retain them at the lower ends of the slots when the cover is in place, said cover and cup having coacting means to detachably secure the cover on the cup.

2. An oil cup comprising a member having a cone-shaped lower portion and an outlet mouth, the upper portion of the member being provided with threads and having oppositely disposed vertically arranged cut away portions or slits, bearings within these slits, a threaded cover for the member adapted to engage the bearings, a crank shaft within the bearings, a plunger rod having a plunger connected with the crank shaft, and an operating rod connected with the crank shaft to reciprocate the plunger to force the lubricant through the outlet mouth.

In testimony whereof I affix my signature in presence of two witnesses.

WALTER McLAIN.

Witnesses:
JOHN KNAUF,
LUCILE GILBERTSON.